(12) United States Patent
Ogura

(10) Patent No.: US 8,419,242 B2
(45) Date of Patent: Apr. 16, 2013

(54) ILLUMINATING LAMP

(75) Inventor: Yoshiaki Ogura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 13/057,634

(22) PCT Filed: Aug. 3, 2009

(86) PCT No.: PCT/JP2009/063728
§ 371 (c)(1),
(2), (4) Date: Feb. 4, 2011

(87) PCT Pub. No.: WO2010/016453
PCT Pub. Date: Feb. 11, 2010

(65) Prior Publication Data
US 2011/0141719 A1    Jun. 16, 2011

(30) Foreign Application Priority Data
Aug. 5, 2008  (JP) .................................. 2008-201410

(51) Int. Cl.
*F21S 8/00* (2006.01)
*F21S 13/10* (2006.01)
(52) U.S. Cl.
USPC ............ 362/431; 362/183; 362/276; 362/802
(58) Field of Classification Search .................. 362/183, 362/192–194, 276, 431, 802
See application file for complete search history.

(56) References Cited

FOREIGN PATENT DOCUMENTS

| CN | 2773476 Y | 4/2006 |
|---|---|---|
| JP | 2002-42509 A | 2/2002 |
| JP | 2003-157817 A | 5/2003 |
| JP | 2003-331804 A | 11/2003 |
| JP | 2004-87349 A | 3/2004 |
| JP | 2004-207109 A | 7/2004 |
| JP | 2005-235513 A | 9/2005 |
| JP | 2006-244711 A | 9/2006 |
| JP | 2006-277979 A | 10/2006 |
| JP | 2006-329127 A | 12/2006 |
| KR | 2005/0054110 | 6/2005 |
| KR | 0740352 | 7/2007 |

*Primary Examiner* — Jason Moon Han
(74) *Attorney, Agent, or Firm* — Birch, Stewart, Kolasch & Birch, LLP

(57) ABSTRACT

An outdoor-installed illuminating lamp provided with a power generation member and a storage battery. The storage battery and electric components, etc. are made to be easy to mount to the inside of a pole, thereby improving workability of an assembling work and wiring work. The illuminating lamp (1) comprises the pole (2) which is provided with the power generation member for generating power using natural energy, the storage battery for storing the power obtained by the power generation member, and an illuminating section (3) lighted using the accumulated power. The pole (2) has a hollow inside, wherein provided, in an insertable and removable manner, is a shelf assembling member (10) comprising a plurality of placing shelves (12) to place the storage battery and the electric components. An aperture section allowing replacement of the storage battery and the electric components is provided in the lateral surface of the pole (2) and is provided with an openable and closable cover member (5).

8 Claims, 4 Drawing Sheets

ILLUMINATING LAMP

TECHNICAL FIELD

The present invention relates to an illuminating lamp for installation outdoors provided with an electric generator and a rechargeable battery.

BACKGROUND ART

There are conventionally known, as illuminating lamps for installation in areas, locations, etc. where electric power is not readily available, illuminating lamps provided with an electric generator that generates electric power by use of natural energy, such as with solar panels or by wind power electricity generation.

These illuminating lamps are typically structured as follows: in a top part of a support column, there are fitted an electric generator, such as one using a solar panel or one relying on wind power, and an illuminator; the support column is installed to stand upright, with a bottom end part thereof fitted directly onto a base or buried in the ground. They are also provided with a rechargeable battery for storage of the electric power generated by the electric generator.

When electric components such as a rechargeable battery and a controller are fitted, if the relationship between the size of the rechargeable battery to be fitted and that of the support column is such that the rechargeable battery is larger, the rechargeable battery cannot be housed inside the support column, and is instead accommodated in a controller box or power distributor box provided outside the support column. Seeing that illuminating lamps for installation outdoors are expected to be compact and good-looking, it is desired that the rechargeable battery and other electric components be accommodated inside the support column.

To achieve that, a known street lamp is provided with a plurality of rechargeable batteries that can be accommodated inside a support column, and the inside of the support column is partitioned into a plurality of chambers for accommodating the rechargeable batteries (see, for example, Patent Document 1 listed below).

Likewise, a known garden lantern incorporating an electric generation device relying on solar power has a rechargeable battery and a controller accommodated inside a column of stone (see, for example, Patent Document 2 listed below)

LIST OF CITATIONS

Patent Literature

Patent Document 1: JP-A-2004-87349
Patent Document 2: JP-A-2002-42509

SUMMARY OF INVENTION

Technical Problem

Certainly, accommodating a rechargeable battery and electric components inside a support column makes it possible to realize an illuminating lamp that is compact and good-looking. However, so long as shelf components formed of sheet metal are fixed inside the support column with screws or by welding, their fitting is not easy but rather troublesome. With a comparatively small-size support column, fitting shelf components and electric components inside it is particularly difficult, and also difficult is wiring between the rechargeable battery and electric components accommodated and to an illuminator and an electric generator.

It is therefore preferable not only that a rechargeable battery, electric components, etc. be accommodated inside a support column, but also that their fitting inside the support column be easy, and further that wiring and component replacement, whenever necessary, be easy.

Accordingly, an object of the present invention is to provide, as an illuminating lamp that has an electric generator—one generating electric power by use of natural energy—, a rechargeable battery, and an illuminator fitted on or in a support column, one that allows easy fitting of the rechargeable battery, electric components, etc. inside the support column and that offers enhanced ease of assembly, wiring, and other work.

Solution to Problem

To achieve the above object, according to the invention, an illuminating lamp including an electric generator which generates electric power by use of natural energy, a rechargeable battery which stores the electric power generated by the electric generator, and an illuminator which lights by use of the electric power stored, the electric generator, the rechargeable battery, and the illuminator being fitted on or in a support column, is characterized in that the support column has a hollow space inside, that a shelf assembly that has a plurality of placement shelves for placement of the rechargeable battery and an electric component thereon is removably fitted inside the hollow space, that an opening that permits replacement of the rechargeable battery and the electric component is formed in a side face of the support column, and that the opening is detachably fitted with a lid member.

With this structure, the shelf assembly having a plurality of rechargeable batteries and electric components placed thereon is removably inserted inside the hollow space inside, and thus the rechargeable batteries, electric components, etc. can be, in a state previously assembled into an integral unit, accommodated inside the support column. Assembling, in this way, the rechargeable battery, electric components, etc. to be fitted inside the support column previously outside the support column and then accommodating them inside the support column allows easy assembly. Wiring can also be done simultaneously at the time of assembly outside the support column, and this enhances ease of assembly, wiring, and other work. Furthermore, the rechargeable battery and electric components thus accommodated in a state assembled into an integral unit can be, with the lid member removed, individually subjected to wiring check and replacement. Thus, it is possible to realize an illuminating lamp that allows easy maintenance in terms of replacement, checking, and other work.

According to the invention, the illuminating lamp structured as described above is further characterized in that the shelf assembly has four support frame posts that support the placement shelves at four corners thereof, with the placement shelves fitted on the support frame posts at predetermined intervals along the length thereof, and that an insertion guide portion that slidably supports the support frame posts is provided inside the hollow space. With this structure, with the rechargeable battery, electric components, etc. previously assembled on the shelf assembly having a plurality of placement shelves fitted on the support frame posts so as to form an integral unit, the support frame posts are inserted in the insertion guide portion, so that the integral unit can be accommodated inside the support column. Moreover, since the intervals between the vertically arranged placement shelves are predetermined, the cables and the like for wiring can be previously cut into prescribed lengths, and this helps prevent problems at the time of wiring, such as short-circuiting.

According to the invention, the illuminating lamp structured as described above is further characterized in that the support frame posts are each formed of a plate member having a convex cross section, the convex part serving as a placement shelf rack portion and the parts on both sides thereof serving as guide plate portions, that the support column is formed as an extrusion of aluminum, and the insertion guide portion includes a cavity in which the placement shelf rack portion is inserted and grooves in which the guide plate portions fit, and that engaging the guide plate portions with the grooves permits the entire shelf assembly having a predetermined rechargeable battery and electric components fitted thereon to be inserted as an integral unit. With this structure, the support column formed as an extrusion of aluminum makes the illuminating lamp good-looking. Moreover, an extrusion of aluminum makes it easy to form, inside the support column, an insertion guide portion including a cavity in which the placement shelf rack portion is inserted and grooves in which the guide plate portions fit, and is therefore suitable as the support column of the illuminating lamp inside which the shelf assembly having the rechargeable battery, electric components, etc. previously assembled on it is inserted as an integral unit.

According to the invention, the illuminating lamp structured as described above is further characterized in that the placement shelves are each formed as an extrusion of aluminum having a concave cross section to have a placement concave portion with a width adapted to a rechargeable battery or electric component placed thereon. With this structure, the rechargeable battery, electric components, etc. placed can be fitted without play, and in addition it is possible to produce a large number of placement shelves of a predetermined shape easily. This is suitable for an illuminating lamp that accommodates a plurality of rechargeable batteries and electric components.

According to the invention, the illuminating lamp structured as described above is further characterized in that a member fitting portion is provided to protrude from a central part of the underside of the placement concave portion, so as to permit an anti-pop-out metal fitting to be fitted to the member fitting portion. With this structure, a separate anti-pop-out metal fitting may be fitted to each placement shelf, or a common anti-pop-out metal fitting may be fitted so as to be coupled with a plurality of placement shelves. Moreover, formed on the underside of the placement concave portion, the member fitting portion does not hamper placement of the rechargeable battery and electric components on the placement shelf, and thus allows easy placement.

According to the invention, the illuminating lamp structured as described above is further characterized in that the anti-pop-out metal fitting is a long member that is fitted for a plurality of vertically arranged placement shelves and that is coupled to individual member fitting portions of those placement shelves. With this structure, after the placement of all the rechargeable batteries and electric components, the anti-pop-out metal fitting can be fitted for all of them integrally, and it is thus possible to prevent the rechargeable battery, electric components, etc. from dropping off.

According to the invention, the illuminating lamp structured as described above is further characterized in that the illuminator is fitted at either of fitting portions provided therefor on opposite side faces of a top part of the support column, and a check lid is attached at whichever of the fitting portions where the illuminator is not fitted. With this structure, the illuminator and the check lid can be fitted in interchangeable directions, and these directions can be changed freely according to the site at which the illuminating lamp is installed. Thus, three are two opposite surfaces on which the illuminator can be fitted, and this makes it possible to install the illuminating lamp efficiently, and with ease.

According to the invention, the illuminating lamp structured as described above is further characterized in that the electric generator is a solar panel provided at a top end of the support column. With this structure, it is possible to realize an illuminating lamp that generates electricity by use of solar power during the day and that lights at night when illumination is needed.

Advantageous Effects of the Invention

According to the present invention, an illuminating lamp has a hollow support column, and inside the hollow space, a shelf assembly having a plurality of placement shelves for placement of a rechargeable battery and a plurality of electric components thereon is removably fitted; in addition, an opening is formed in a side face of the support column to allow replacement of the rechargeable battery and electric components, and the opening is fitted with a detachable lid member. Thus, it is possible to previously assemble the rechargeable battery, electric components, etc. into an integral unit, and also to do wiring outside the support column. Thus, easy assembly is possible by accommodating the previously assembled shelf assembly inside the support column, and this helps realize an illuminating lamp that offers enhanced ease of assembly, wiring, and other work. Furthermore, the rechargeable battery and electric components accommodated in a state assembled into an integral unit can be, with the lid member detached, individually subjected to wiring check and replacement, and this helps realize an illuminating lamp that allows easy maintenance in terms of replacement, checking, and other work.

DESCRIPTION OF EMBODIMENTS

Hereinafter, an embodiment of the present invention will be described with reference to the accompanying drawings. Among different drawings, the same parts are identified by the same reference signs, and no overlapping description of the same parts will be repeated unless necessary.

Figure 1:
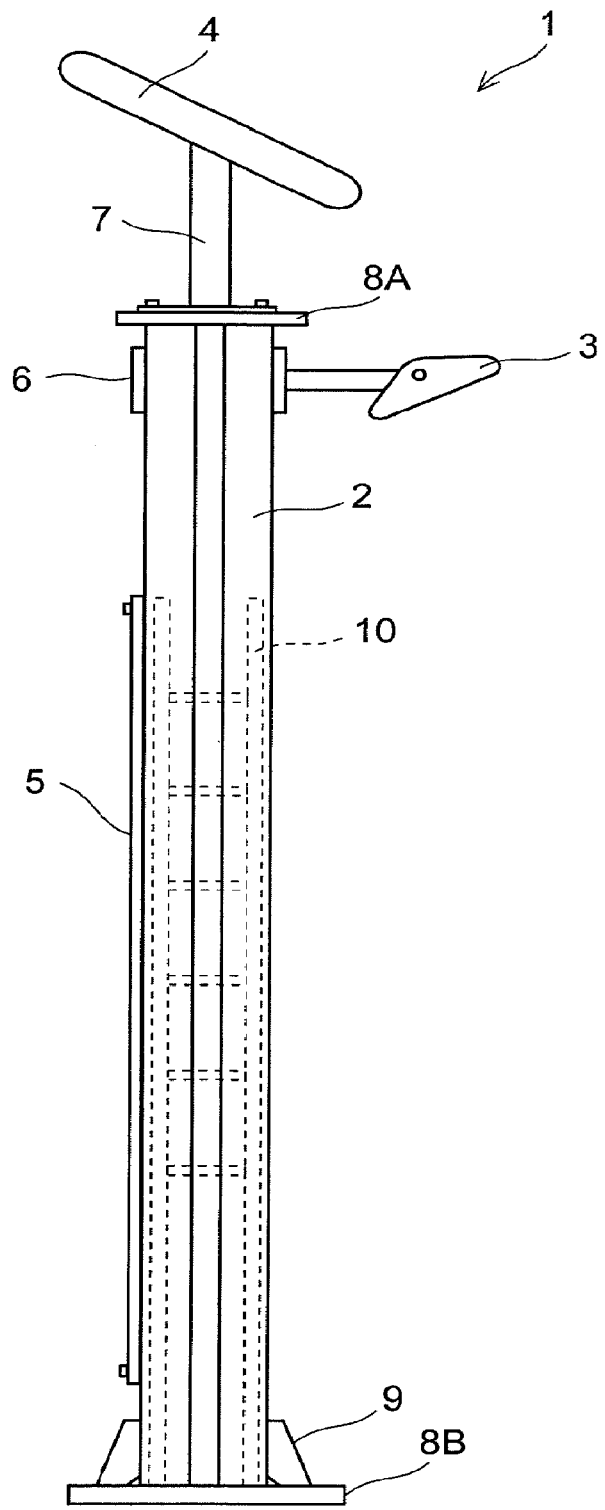
FIG. 1 is an overall side view showing the structure of an illuminating lamp in one embodiment according to the invention.

As shown in FIG. 1, an illuminating lamp 1 according to the embodiment is one that has an electric generator, a rechargeable battery, and an illuminator 3 fitted on or in a support column 2 and that is intended for installation in an area, location, or the like where electric power is not readily available. The electric generator may be any that generates electric power by use of natural energy, such as by electricity generation relying on solar power or wind power. In the embodiment, a solar panel 4 that generates electricity from solar power is fitted at the top end of the support column.

Inside the support column 2, there is housed a shelf assembly 10 having a plurality of placement shelves for placement thereon of a plurality of electric components such as a rechargeable battery and a controller circuit board. Here, preferably, the shelf assembly 10 is such that it is, as an integral unit, removably fitted inside the support column 2, because then the rechargeable battery, electric components, etc. in a state already assembled in position outside the support column 2 can easily be assembled into the support column 2.

To achieve that, in the embodiment, the shelf assembly 10 is composed of four support frame posts and a plurality of placement shelves, the support frame posts supporting the placement shelves at their four corners, the placement shelves being fitted on the support frame posts at predetermined intervals along the length thereof. In addition, in the hollow inside of the support column 2, there are provided insertion guide portions that slidably support the support frame posts. With this structure, a rechargeable battery, electric components, etc. are previously assembled on the shelf assembly that has a plurality of placement shelves fitted on the support frame posts, so as to form an integral unit; the support frame posts are then inserted in the insertion guide portions, so that the integral unit can be accommodated inside the support column. Since the intervals between the vertically arranged placement shelves are predetermined, the cables and the like for wiring can be previously cut into prescribed lengths, and this helps prevent problems at the time of wiring, such as short-circuiting.

Since the shelf assembly 10 having a plurality of placement shelves for placement thereon of a rechargeable battery and a plurality of electric components is, as an integral unit, removably fitted inside the support column, it is possible to previously assemble the rechargeable battery, electric components, etc. in position outside the support column and then accommodate them inside the support column. It is also possible to do wiring between the rechargeable battery and electric components at the time of assembly outside the support column. This facilitates, and enhances ease of assembly, wiring, and other work.

The support column 2 has simply to be hollow to such a degree that it can accommodate the shelf assembly having the rechargeable battery, electric components, etc. previously assembled thereon so as to form an integral unit, and be provided with insertion guide portions that permit the shelf assembly to be removably fitted inside the support column 2. The support column 2 can thus be formed by use of steel pipe or the like of any shape. It is preferable, however, to form it as an extrusion of aluminum, because it is then possible to form insertion guide portions of a desired shape integrally and easily, and to produce the support column 2 on a mass scale.

Forming the support column 2 as a hollow extrusion of aluminum makes it easy to form insertion guide portions that permit the shelf assembly 10 to be removably fitted in the hollow space inside the support column 2. Moreover, an extrusion of aluminum makes it possible to produce the support column with a good exterior design, and thus to make the illuminating lamp 1 compact and good-looking. Furthermore, forming the support column 2 as an extrusion of aluminum makes it easy to form a groove with predetermined dimensions continuously along the length of the support column; thus, by producing a long extrusion and then cutting it into desired lengths, it is possible to produce the column 2 in large numbers easily. Moreover, it can be produced in any exterior shape—rectangular, polygonal, or circular—to suit the desired exterior design. It is also possible to previously form a desired groove on the outer surface, and thus to produce the support column 2 with consideration given to its design.

Accordingly, in the embodiment, used as the support column 2 is an extrusion of aluminum with a rectangular cross section. A specific example of it will now be described with reference to FIG. 4.

Figure 4A:
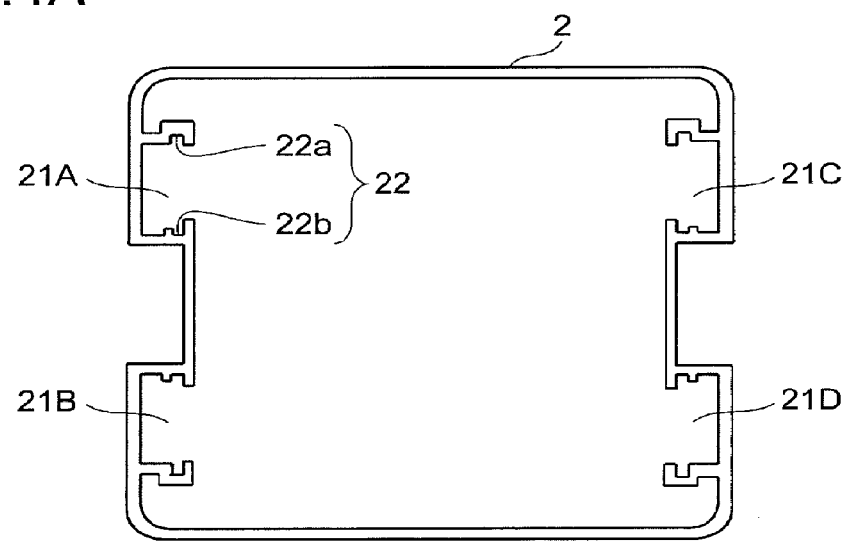
FIG. 4 shows an example of a support column according to the invention, with a sectional view of the support column itself at (a), a sectional view of the same having a shelf assembly assembled into it at (b), and an enlarged view of part of the same at (c).
Figure 4B:
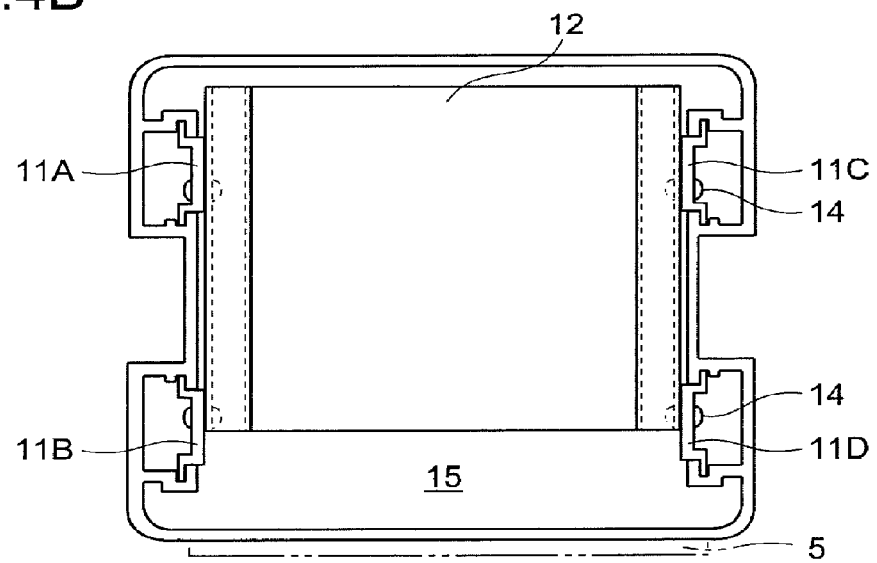
Figure 4C:
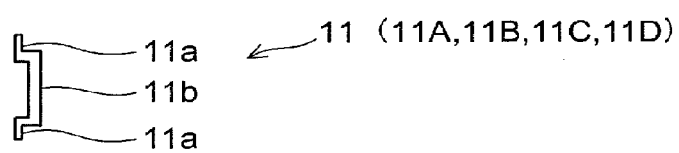

As shown in FIG. 4(*a*), inside the support column 2 formed as an extrusion of aluminum, as seen on its cross section, there are formed cavities 21 (21A, 21B, 21C, and 21D). In each of these cavities, grooves 22 (22a and 22b) are formed in which a plate member can be inserted.

The grooves 22 are formed with fixed dimensions continuously along the length of the support column 2, and serve as guide grooves that slidably guide a member along the length of the support column 2. For that purpose, the grooves 22 (22a and 22b) are formed in each of the cavities 21 (21A, 21B, 21C, and 21D) formed at four places inside the support column 2. Thus, a member that is slidable along its length while guided at four places around it can be fitted inside the support column 2. Thus, the cavities 21 and the grooves 22 form insertion guide portions.

Accordingly, as shown in FIG. 4(*b*), support frame posts 11 for supporting a placement shelf 12 are so disposed as to pair with the grooves 22 formed at four places, and a plurality of such placement shelves 12 are fitted on the support frame posts 11 (11A, 11B, 11C, and 11D) at predetermined intervals along the length thereof. Each support frame post is a plate member with a convex cross section, the convex part serving as a placement shelf rack portion, the parts on both sides of it serving as guide plate portions. These guide plate portions are engaged with the grooves 22, and thereby permit the shelf assembly 10 having a predetermined rechargeable battery and electric components assembled on it to be inserted, as an integral unit, inside the support column.

A specific example of the support frame posts 11 described above is shown in FIG. 4(*c*). The support frame post 11 shown there is a plate member with a partly convex cross section, the convex part serving as a placement shelf rack portion 11b, the parts on both sides of it serving as guide plate portions 11a. These guide plate portions 11a are inserted in the grooves 22 formed inside the support column. Thus, by engaging the guide plate portions 11a with the grooves 22 such that the former fit into the latter at each of the four places around, it is possible to insert the shelf assembly 10 having a plurality of placement shelves 12 fitted on the four support frame posts 11, as an integral unit, inside the support column.

As described above, by use of a support column 2 formed as an extrusion of aluminum that has previously formed inside it cavities 21 and grooves 22 as insertion guide portions, a whole assembly, that is, a shelf assembly 10 having a predetermined rechargeable battery and electric components assembled on it so as to form an integral unit, is inserted inside the support column 2. Thus, the shelf assembly 10 having the rechargeable battery and electric components assembled on it so as to form an integral unit can be inserted in and assembled into the support column 2 from either the top or bottom end thereof.

The placement shelves 12 can be fitted on the support frame posts 11 by any fixing method such as with screws, with rivets, by swaging, or by welding, and there is no particular limitation in this regard. In the embodiment, the placement shelves 12 are fixed at its four corners by use of rivets.

Next, the placement shelves 12 will be described with reference to FIG. 3. The placement shelves 12 may be formed by bending sheet metal, or may be formed as an extrusion of aluminum, that is, by extruding aluminum into the desired shape. Forming it as an extrusion of aluminum allows integral forming, and makes it possible to produce the placement shelves 12 in large numbers easily.

Figure 3A:
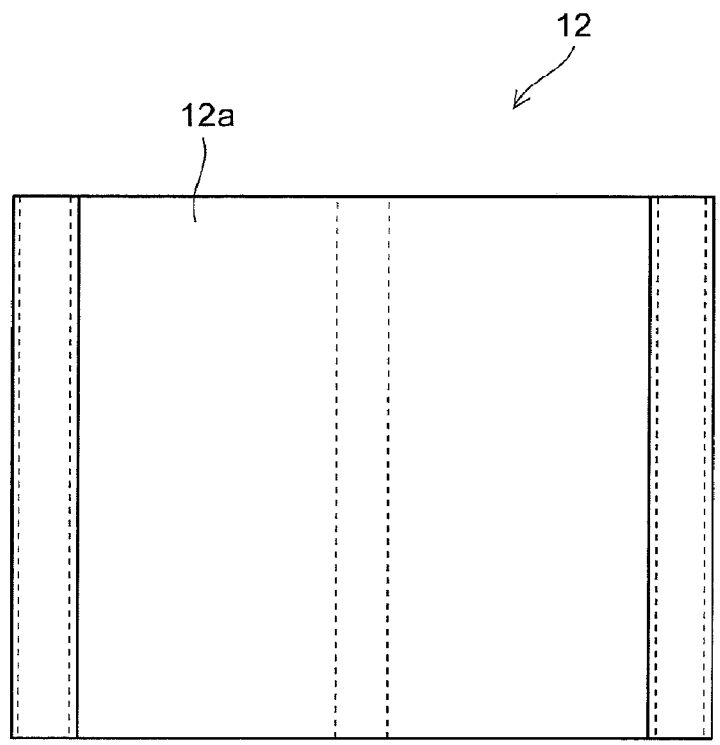
FIG. 3 shows an example of a placement shelf according to the invention, with a plan view at (a) and a front view at (b).
Figure 3B:
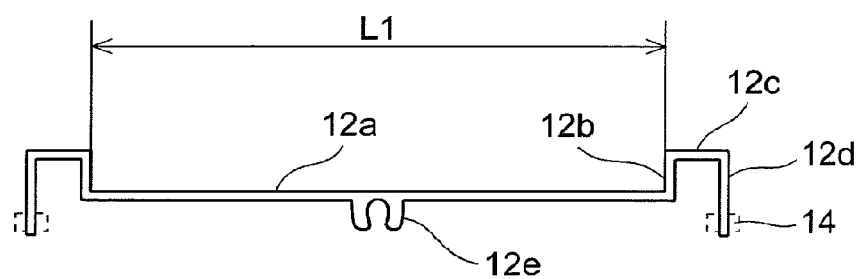

As shown in FIGS. 3(a) and (b), the placement shelf 12 has a placement concave portion 12a formed therein. A rechargeable battery, electric components, etc. are placed on this placement concave portion 12a, which is thus given a width L1 adapted to the width of the rechargeable battery and electric components placed thereon. With this structure, the rechargeable battery, electric components, etc. can be properly positioned horizontally so as to be placed without play. This facilitates placement of a desired rechargeable battery and electric components on the placement shelf.

Opposite side parts of the placement shelf 12 are formed into fitting portions 12d that are fixed to the support frame posts 11. Thus, as a while, the placement shelf 12 has a concave cross section composed of a placement concave portion 12a, first sides 12b, top surfaces 12c, and second sides serving as the fitting portions 12d.

Furthermore, in a central part of the underside of the placement concave portion 12a, there is provided a member fitting portion 12e. When the placement shelf 12 is formed as an extrusion, the member fitting portion 12e can be formed integrally. As a result of being formed as an extrusion having a concave cross section, the placement shelf 12 has satisfactory mechanical strength owing to its concave and convex structure. Moreover, formed on the underside of the placement concave portion 12a, the member fitting portion 12e does not hamper placement of a desired rechargeable battery and electric components on the placement shelf 12, and thus allows easy placement. To the member fitting portion 12e, an anti-pop-out metal fitting (not shown) can be fitted. A separate anti-pop-out metal fitting may be fitted to each placement shelf 12, or a common long anti-pop-out metal fitting or anti-drop member may be fitted so as to be coupled with a plurality of placement shelves.

The member fitting portion 12e is provided with a screw hole, into which a fixing screw is screwed to place and fix an anti-pop-out metal fitting formed as a plate or shaped member. Thus, after a desired rechargeable battery and electric components are placed on the placement shelf 12, it is possible to fit an anti-pop-out metal fitting (serving also as an anti-drop member; not shown) to each member fitting portion 12e, or so as to couple a plurality of vertically arranged placement shelves 12, in order to thereby prevent the rechargeable battery and electric components already placed from popping out or dropping off.

Figure 2A:
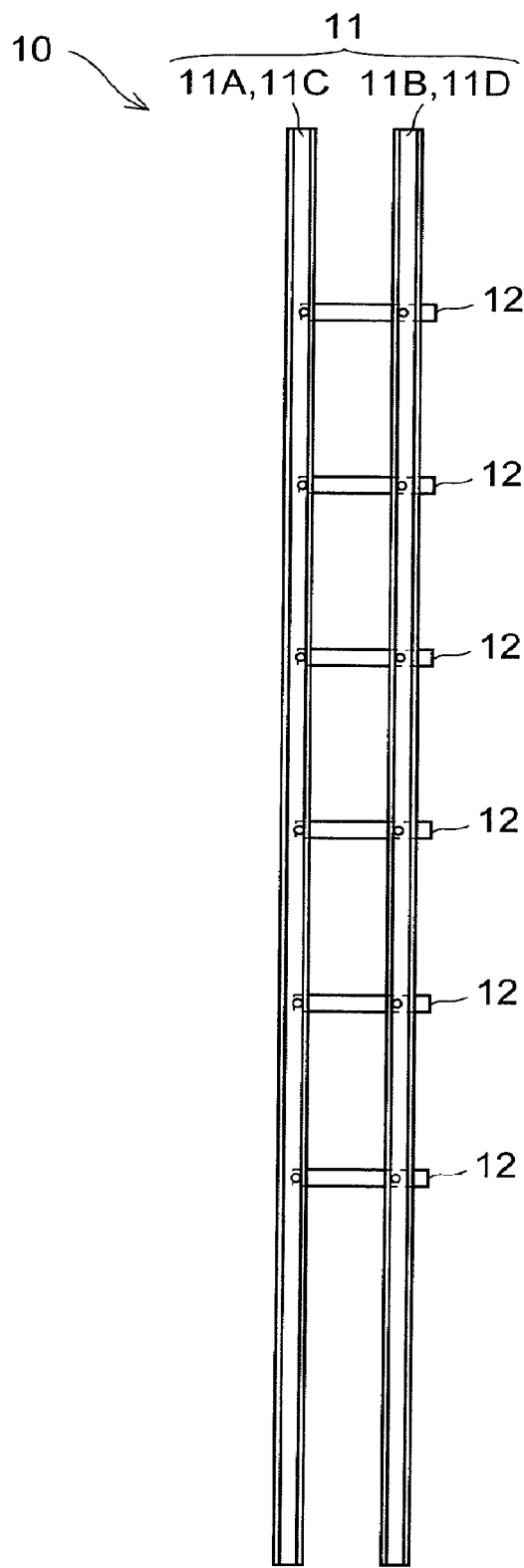
FIG. 2 shows a shelf assembly according to the invention, with a side view at (a) and a front view at (b).
Figure 2B:
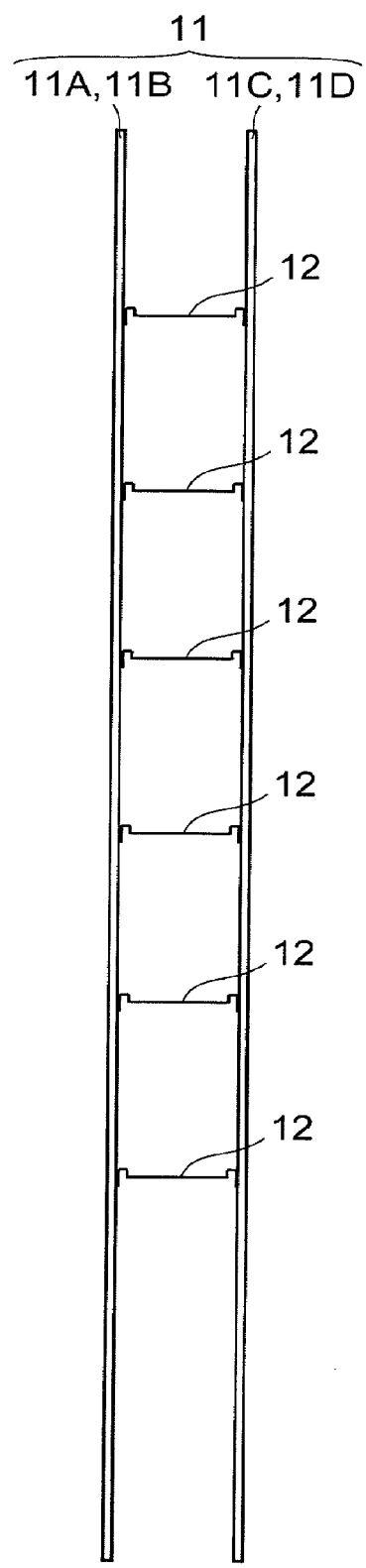

Next, with reference to FIG. 2, the shelf assembly 10 will be described. As shown in a side view in FIG. 2(a) and a front view in FIG. 2(b), the shelf assembly 10 has a plurality of placement shelves 12 assembled on four frame posts 11 (11A, 11B, 11C, and 11D). The number of placement shelves 12 fitted is equal to, at least, the number of rechargeable batteries and electric components used. This is to place all the rechargeable batteries and electric components each on a separate placement shelf, and placing one component on one shelf helps facilitate assembly and replacement work. The intervals between the vertically arranged placement shelves are adapted to the heights of the rechargeable battery and electric components placed, so as to be sufficient to allow connection and wiring after placement.

A plurality of rechargeable batteries may be used. When used in plurality, even small batteries can store a large amount of electric power, and can contribute to efficient solar power electricity generation. They are thus suitable in illuminating lamps for installation in area, locations, etc. where electric power is not readily available. Thus, the placement shelves 12 are provided in such a number that all the electric components including a plurality of rechargeable batteries and a controller for controlling their charging and discharging can be placed on separate placement shelves.

With the structure described above, the shelf assembly 10 can be assembled outside the support column so that a rechargeable battery and electric components are placed on separate placement shelves 12 so as to faun an integral unit. Moreover, after placement of the rechargeable battery and electric components, wiring for connecting them can be done simultaneously, and this facilitates wiring work. Moreover, since the intervals between the vertically arranged placement shelves are predetermined, it is possible to previously give a component for wiring the rechargeable battery such a length that, even when the terminal at its one end is connected to a terminal on the rechargeable battery, the terminal at the other end does not make contact with a terminal of the opposite polarity. This helps prevent accidents due to short circuiting or the like, and allows safe wiring work.

The shelf assembly 10, now having a plurality of rechargeable batteries and electric components placed on it and wiring completed so as to form an integral unit, can then be inserted, as a whole, inside the hollow support column, by fitting the guide plate portions 11a of the frame posts 11 into the grooves 22 of the insertion guide portions provided inside the support column 2.

As shown in FIG. 1, after the shelf assembly 10 having a predetermined rechargeable battery and electric components fitted on it is, as an integral unit, inserted inside the support column 2, a top plate 8A and a bottom plate 8B are fitted to close the top and bottom ends of the support column 2. If the support column 2 always stays upright, the shelf assembly 10 may be supported on the bottom plate 8B; if the support column 2 can be inclined, it is preferable that the shelf assembly 10 inserted inside the support column be fixed. There is no particular limitation on how it is fixed; it may be fixed, for example, with screws or by welding.

Moreover, in a side face of the support column 2, at a position corresponding to where the shelf assembly 10 is fitted in, an opening is provided that permits replacement of the rechargeable battery and electric components, and the opening is detachably fitted with a lid member 5. When the lid member 5 is detached, it is possible to visually check the rechargeable battery and electric components inside, check the wiring, and replace devices and components. Owing to the provision of the lid member 5, when it is detached, the rechargeable battery and electric components, although assembled into an integral unit and fitted inside, can be individually subjected to wiring check and replacement. This helps realize an illuminating lamp that allows easy maintenance in terms of replacement, checking, and other work.

To facilitate wiring check and component replacement with the lid member 5 detached, it is preferable to arrange the wired parts in the operable side, or make them removable through the operable side. Accordingly, in the side where the lid member 5 is attached, a work margin 15 (see FIG. 4(b)) is provided. Also in this side where the work margin 15 is provided, the previously mentioned anti-pop-out metal fittings are fitted.

The installation of the illuminating lamp 1 is achieved by anchoring the bottom plate 8B to a concrete floor used as a foundation. The bottom plate 8B has a plurality of reinforcing ribs 9 arranged on it, and a base part of the support column 2 may be buried in the ground to hide the reinforcing ribs 9.

In a top part of the support column 2, the illuminator 3 is provided. The illuminator 3 fitted in a top part of the support column 2 can be fitted at either of two fitting portions on opposite side faces of the support column 2. At the fitting portion where the illuminator 3 is not fitted, a check lid 6 is attached. With this structure, it is possible, when the check lid 6 is detached, to check and maintain the wiring for the illuminator 3; it is also possible to fit the illuminator 3 and the check lid 6 in interchangeable directions so that the direction in which the illuminator 3 is fitted can be changed freely according to the site at which the illuminating lamp 1 is installed. Thus, there are two opposite surfaces on which the illuminator can be fitted, permitting it be fitted in the same direction as, or in the opposite direction from, the direction in which the lid member 5 is attached.

With the structure described above, for example, even when an obstacle is present right at the back of the site where the illuminating lamp is to be installed and thus the lid member 5 cannot be provided at the back, the illuminating lamp can be installed at that site such that the lid member 5 faces frontward. Thus, it is possible to install the illuminating lamp efficiently, and with ease.

As a light-emitting unit for the illuminator 3, an LED light-emitting unit is suitable. Using an LED light-emitting unit helps achieve high-luminance illumination with low power consumption. LED light-emitting units of different colors may be combined to achieve illumination in a plurality of colors.

The solar panel 4 provided in a top end part of the support column 2 is fitted on a support rod 7 provided to stand upright from the top plate 8A. Fitting the solar panel 4 inclinable on the support rod 7 makes it possible to adjust the inclination of the solar panel 4 according to the site at which the illuminating lamp 1 is installed, and thus to arrange the solar panel 4 in such an orientation as to offer high power generation efficiency. There is no particular limitation on how it is inclinable fitted; for example, the support rod 7 may be given a two-rod structure composed of a fixed rod and an inclinable rod, or a ball joint member may be fitted in a top part of the support rod 7 so that the solar panel 4 is inclinable fitted.

As the electric generator that generates electric power by use of natural energy, it is also possible to use one using wind power electricity generation, in which case, in place of the solar panel 4 described above, a windmill electric generation device is provided. A windmill electric generation device may be used in combination with a solar panel so that, when the weather is clear and there is no wind, the solar panel is predominantly used and, when there is wind, the windmill electric generation device is predominantly used; in this way it is possible to form an all-weather electric generator.

As described above, according to the present invention, an illuminating lamp uses a hollow support column, and inside it, a shelf assembly having a plurality of placement shelves is fitted. A rechargeable battery, electric components, etc. can thus be previously assembled on the shelf assembly to so as to form an integral unit, and in addition wiring can be done not inside but outside the support column. In this way, it is possible to realize an illuminating lamp that offers enhanced ease of assembly, wiring, and other work.

In particular, assembly involving fitting of and wiring among a plurality of rechargeable batteries and electric components can be done in spacious work space outside the support column. This makes it possible to do complicated wiring safely without causing problems such as short circuiting.

Moreover, forming the support column as a hollow extrusion of aluminum makes it possible to produce the support column with a good exterior design, and thus helps makes the illuminating lamp 1 compact and good-looking. Furthermore, forming the support column as an extrusion of aluminum makes it easy to form inside it insertion guide portions having cavities and grooves with predetermined dimensions; it is then possible, by producing a long extrusion having insertion guide portions formed with predetermined dimensions and then cutting it into desired lengths, to produce a large number of support columns easily.

INDUSTRIAL APPLICABILITY

Illuminating lamps according to the invention include an electric generator that generates electric power by use of natural energy and a rechargeable battery, and offer enhanced ease of assembly, wiring, and other work; they are thus suitably used as illuminating lamps installed outdoors where no commercial electricity is available.

LIST OF REFERENCE SIGNS

1 Illuminating lamp
2 Support column
3 Illuminator
4 Solar panel
5 Lid member
6 Check lid
10 Shelf assembly
11 Frame post
11a Guide plate portion
11b Placement shelf rack portion
12 Placement shelf
12a Placement concave portion
21 Cavity (insertion guide portion)
22 Grooves (insertion guide portion)

The invention claimed is:

1. An illuminating lamp comprising an electric generator which generates electric power by use of natural energy, a rechargeable battery which stores the electric power generated by the electric generator, and an illuminator which lights by use of the electric power stored, the electric generator, the rechargeable battery, and the illuminator being fitted on or in a support column, wherein
   the support column has a hollow space inside,
   a shelf assembly that has at least one placement shelf for placement of the rechargeable battery and an electric component thereon is removably fitted inside the hollow space,
   an opening that permits replacement of the rechargeable battery and the electric component is formed in a side face of the support column, and
   the opening is detachably fitted with a lid member,
   wherein the shelf assembly has at least one support frame post that supports the placement shelf at a corner thereof, with the placement shelf fitted on the support frame post, and
   an insertion guide portion that slidably supports the support frame post is provided inside the hollow space.

2. The illuminating lamp according to claim 1, wherein
   the shelf assembly has, as the support frame post, four support frame posts that support the placement shelf at four corners thereof, and, as the placement shelf, a plurality of placement shelves are fitted on the support frame posts at predetermined intervals along the length thereof.

3. The illuminating lamp according to claim 2, wherein
the support frame posts are each formed of a plate member having a convex cross section, the convex part serving as a placement shelf rack portion and the parts on both sides thereof serving as guide plate portions,
the support column is formed as an extrusion of aluminum, and the insertion guide portion comprises a cavity in which the placement shelf rack portion is inserted and grooves in which the guide plate portions fit,
engaging the guide plate portions with the grooves permits the entire shelf assembly having a predetermined rechargeable battery and electric components fitted thereon to be inserted as an integral unit.

4. The illuminating lamp according to claim 1, wherein the placement shelves are each formed as an extrusion of aluminum having a concave cross section to have a placement concave portion with a width adapted to a rechargeable battery or electric component placed thereon.

5. The illuminating lamp according to claim 4, wherein a member fitting portion is provided to protrude from a central part of an underside of the placement concave portion, so as to permit an anti-pop-out metal fitting to be fitted to the member fitting portion.

6. The illuminating lamp according to claim 5, wherein the anti-pop-out metal fitting is a long member that is fitted for a plurality of vertically arranged placement shelves and that is coupled to individual member fitting portions of those placement shelves.

7. The illuminating lamp according to claim 1, wherein the illuminator is fitted at either of fitting portions provided therefor on opposite side faces of a top part of the support column, and a check lid is attached at whichever of the fitting portions where the illuminator is not fitted.

8. The illuminating lamp according to claim 1, wherein the electric generator is a solar panel provided at a top end of the support column.

* * * * *